United States Patent [19]

DiFlora et al.

[11] Patent Number: 4,926,081
[45] Date of Patent: May 15, 1990

[54] THERMALLY PROTECTED HERMETIC MOTOR COMPRESSOR

[75] Inventors: Michael A. DiFlora; James M. Brown, both of Sidney; Steven L. Rice; Jeffery D. Ramsey, both of Dayton, all of Ohio

[73] Assignee: Copeland Corporation, Sidney, Ohio

[21] Appl. No.: 157,943

[22] Filed: Feb. 11, 1988

[51] Int. Cl.$^5$ ............................................. H02K 11/00
[52] U.S. Cl. ...................................... 310/89; 310/68 C; 310/42; 310/71
[58] Field of Search ..................... 310/42, 43, 686, 71, 310/89, 91, 260, 270; 318/473, 334, 788; 361/20, 22, 23, 24, 25

[56] References Cited

U.S. PATENT DOCUMENTS

| | | | |
|---|---|---|---|
| 4,236,092 | 11/1980 | DiFlora | 310/68 c |
| 4,412,791 | 11/1983 | Lal | 417/312 |
| 4,503,347 | 3/1985 | Bergman | 310/68 C |
| 4,571,517 | 2/1986 | Chastine | 310/68 C |

FOREIGN PATENT DOCUMENTS

| | | | |
|---|---|---|---|
| 0066644 | 12/1982 | European Pat. Off. | 310/71 |
| 0957360 | 9/1982 | U.S.S.R. | 310/71 |

OTHER PUBLICATIONS

AMP, Data Sheet 76-385, Revised 8-77, Special Terminals and Splices for Automatic Machine Applications, pp. 5-21 to 5-26, not known if published.

AMP, Terminal, Mag-Mate Standard Series (No. 114-2066, Rev. B, dated 12/5/1985), pp. 1-5, not known if published.

AMP Fine Wire Magnet Wire Interconnect System, C. E. Reynolds, AMP Inc., noted as having been presented at Insulation and Coil Winding Conference, Sep. 26-28, 1978, ten (10) pages.

Primary Examiner—Patrick R. Salce
Assistant Examiner—Judson H. Jones
Attorney, Agent, or Firm—Harness, Dickey & Pierce

[57] ABSTRACT

A retention arrangement for retaining a motor cover and a thermal protection device over one end of a dynamoelectric motor uses connection bolts already available on the motor for mounting the stator and positions the protector in an annulus between the cover side wall and stator end turns and below the upward extension of the stator end turns. The retention arrangement includes a pair of plates being bolted to the motor and encircling the end turns of the stator with first interengageable portions securing the cover to the plates and second interengageable portions securing at least one plate to a holder to which the protector is mounted, such retention assuring that after the air space between the stator and rotor is set a suction duct will be positioned to cool the protection device and the end turns.

37 Claims, 7 Drawing Sheets

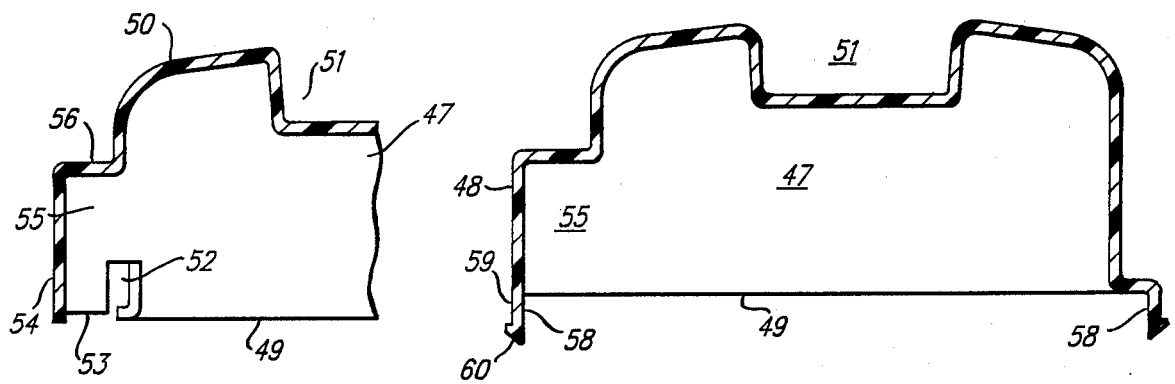
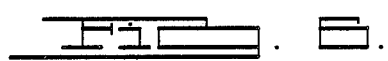
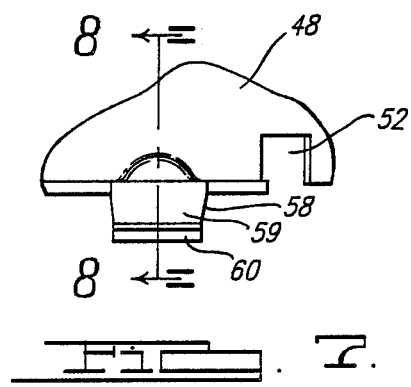
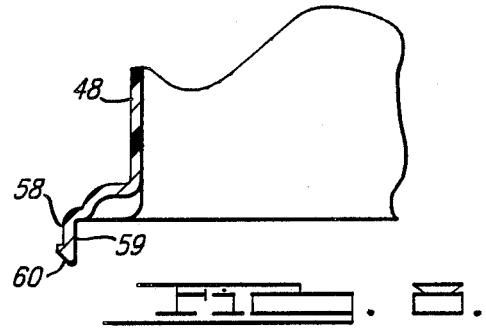
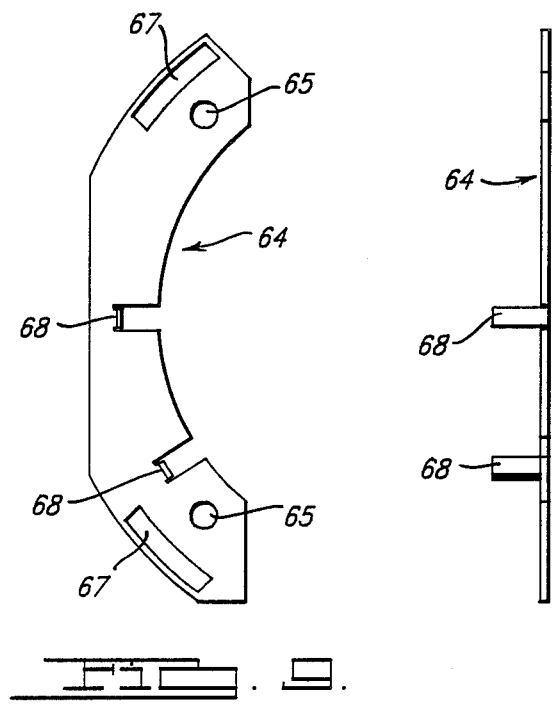
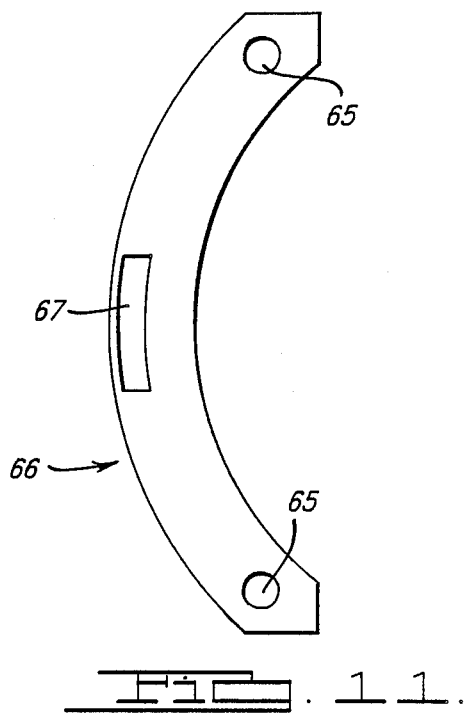

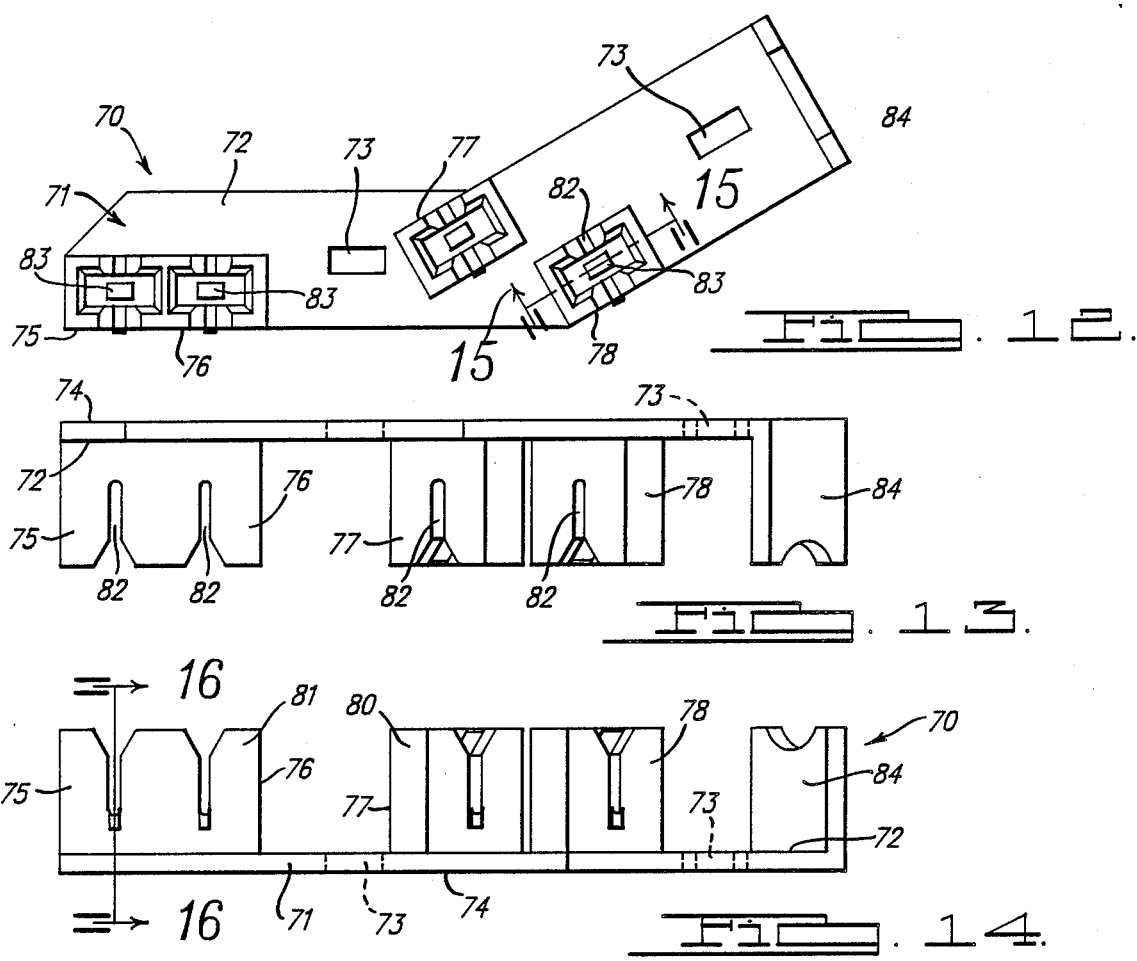
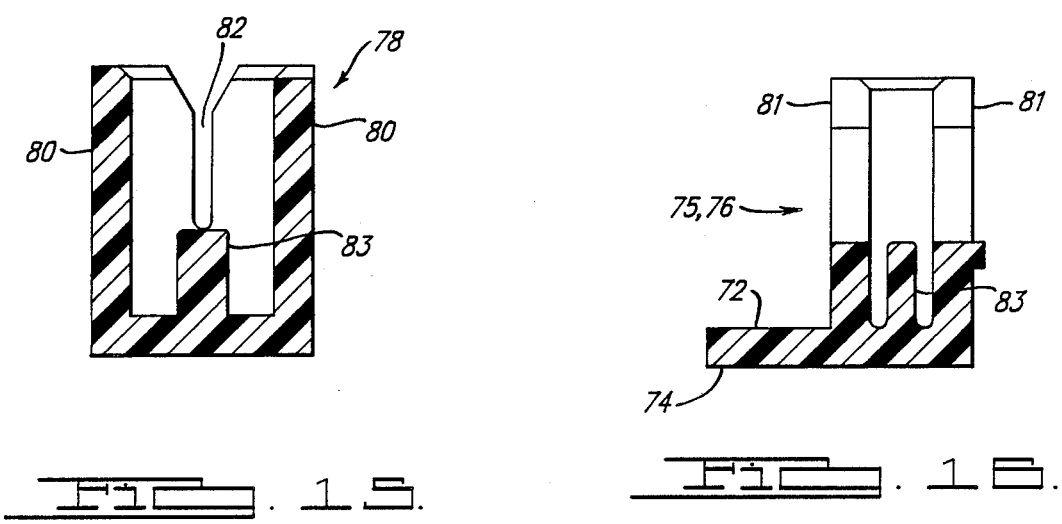

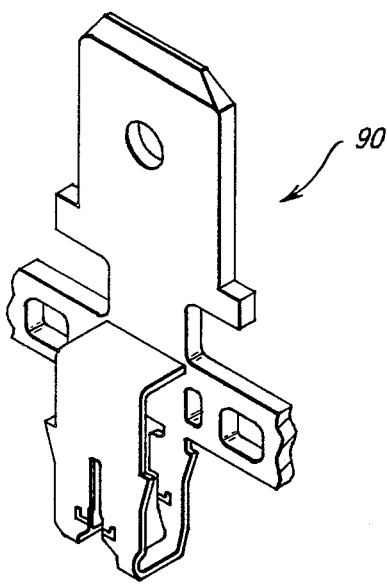
FIG. 17.
FIG. 18.
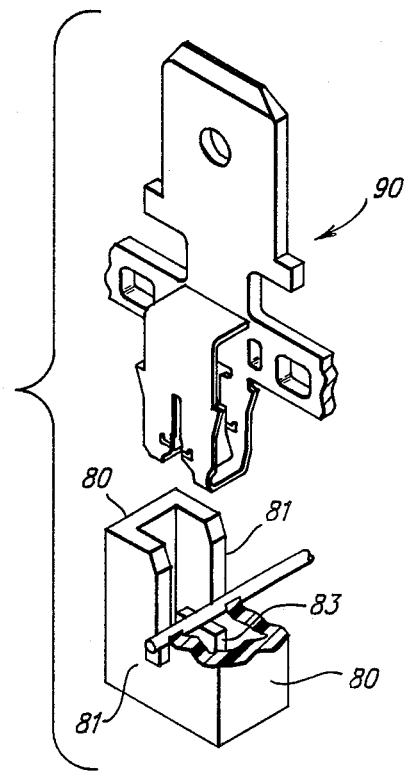
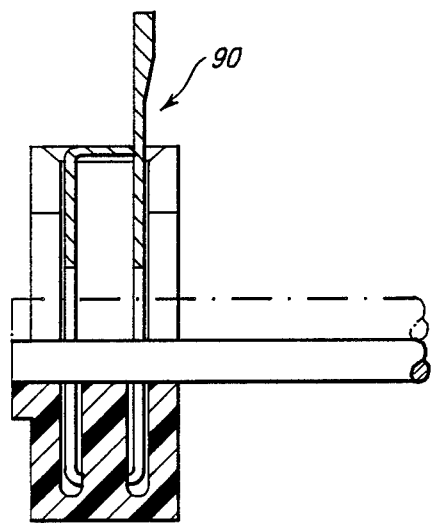
FIG. 19.

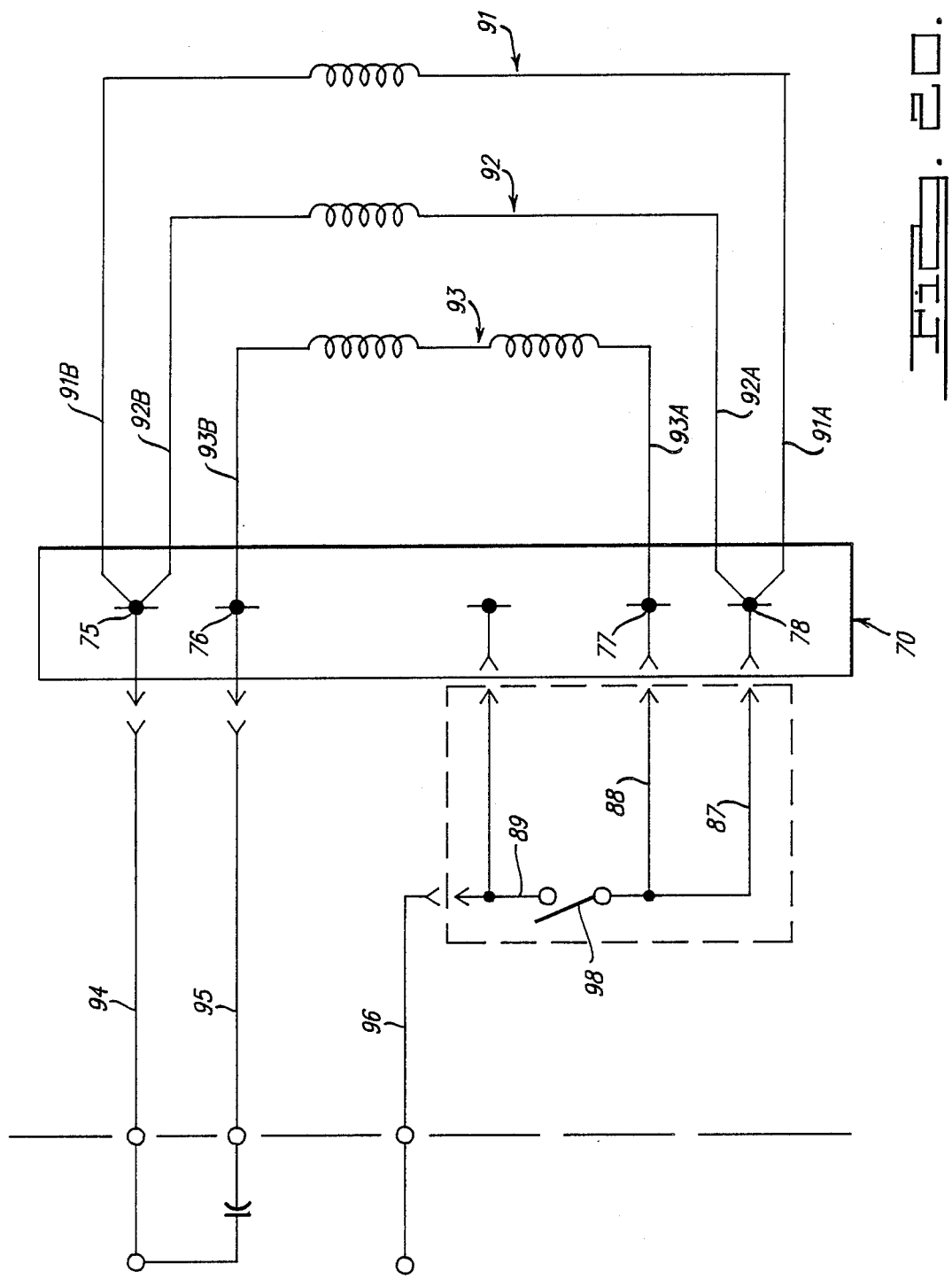

THERMALLY PROTECTED HERMETIC MOTOR COMPRESSOR

This invention relates to an arrangement for securing a thermal protection device and motor cover to the stator structure of a motor compressor.

A widely-used type of refrigeration compressor encloses a motor compressor assembly in a hermetically sealed container or shell. Representative of these motor compressor assemblies are "Compressor Motor Protection" U.S. Pat. No. 4,236,092 issuing Nov. 25, 1980 to Di Flora, "Refrigeration Compressor Apparatus and Method of Assembly" U.S. Pat. No. 4,412,791 issuing Nov. 1, 1983 to Lal and "Thermally Protected Dynamoelectric Machine and Method of Assembly" U.S. Pat. No. 4,503,347 issuing Mar. 5, 1985 to Bergman, the disclosures of which being incorporated by reference herein.

In assembling such motor compressors, the motor stator is positioned on top of and bolted to the frame of the compressor. The air gap between the rotor and stator is adjusted and fixed during assembly of the unit, then the bolts or machine screws which hold the stator in such position are tightened. For reasons connected with the operation of the refrigeration system a shroud or motor cover is secured to the upper end of the motor within the shell, overlying the end turns and the protector.

A thermally responsive motor protection device to provide for protection against burnout of the electric motor is secured to the end turns of the stator winding of the motor since this area heats quickly in the event of an overload, the motor protection device serving to interrupt the motor circuit in the event of overheating. Various protector mounting arrangements have been employed in an effort to achieve maximum efficiency while minimizing disadvantageous factors.

Inasmuch as the motor protector must be installed before the internal motor cover or shroud is secured, difficulty can be encountered in mounting the protector in the most advantageous position, and thereafter securing the shroud, without disturbing the air gap and without resorting to a plurality of smaller, separate screws or fasteners for the cover. It would be advantageous to secure this shroud or cover and the protector by means of the same fasteners which are used to secure the stator to the frame, not only for the sake of economy, but because the bolts or screws which secure the stator are heavy, well secured, and virtually free of any possibility of breakage or loosening under the recurrent vibration encountered during the long service life of these units.

The overall objective of the present invention is to provide an improved system for mounting a thermal protector and motor cover in a motor compressor unit of the type indicated. Another object is provision of a motor cover which functions to inhibit terminals interconnecting the motor wires to the protector from popping loose during operation. A related object is to provide such an improved mounting system which can be quickly and easily installed and supported in a positive manner after the gap between the rotor and stator of the motor has been adjusted and the stator has been permanently fixed in position. Another object is to provide an improved mounting means which reduces labor costs and minimizes the danger of improper installation by virtue of the fact that the protector unit and its supporting means can be easily, quickly and positively locked in place by the simple act of pushing the motor cover into position.

These and other objectives are achieved by a hermetic motor compressor having a retaining arrangement operably connectable to the motor for engagement by a molded cover to simultaneously fasten a heat sensitive circuit protector device within the cover and to the motor. The motor cover is specially configured to allow the user to orient a cooling gas suction inlet port at the top of the motor relative to the thermal protector device. Further, the motor cover is low cost and an effective support structure which will surmount the thermal protector arrangement and efficiently position overload wires relative to the compressor.

The foregoing and the other objects will become more apparent when viewed in light of the accompanying drawings and following detailed description wherein:

FIG. 5 is an elevation view of the cover partially in section and taken along lines 5—5 of FIG. 4.

FIG. 6 is an elevation view of the cover in section and taken along lines 6—6 of FIG. 4.

FIG. 7 is a partial elevation view of the cover.

FIG. 8 is the elevation view of the cover in section taken along lines 8—8 of FIG. 7.

FIGS. 9 and 10 are plan and side views of a first retainer plate.

FIG. 11 is a plan view of a second retainer plate.

FIGS. 12–14 are plan, front and rear elevation views of a protector retainer.

Figure 1:
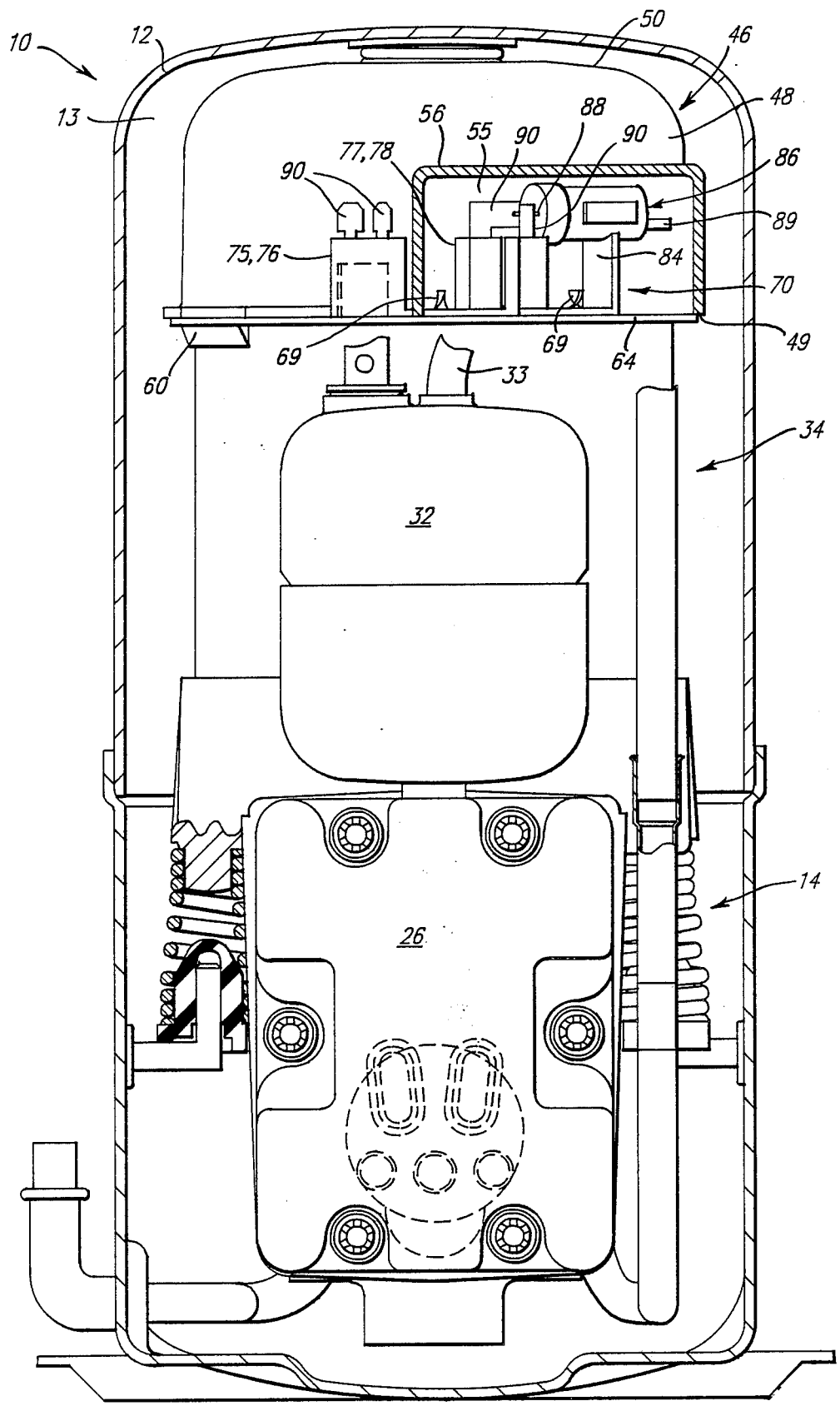
FIGS. 1 and 2 are front and side elevational views partially in section and with portions broken away of a hermetic motor compressor embodying the present invention.
Figure 2:
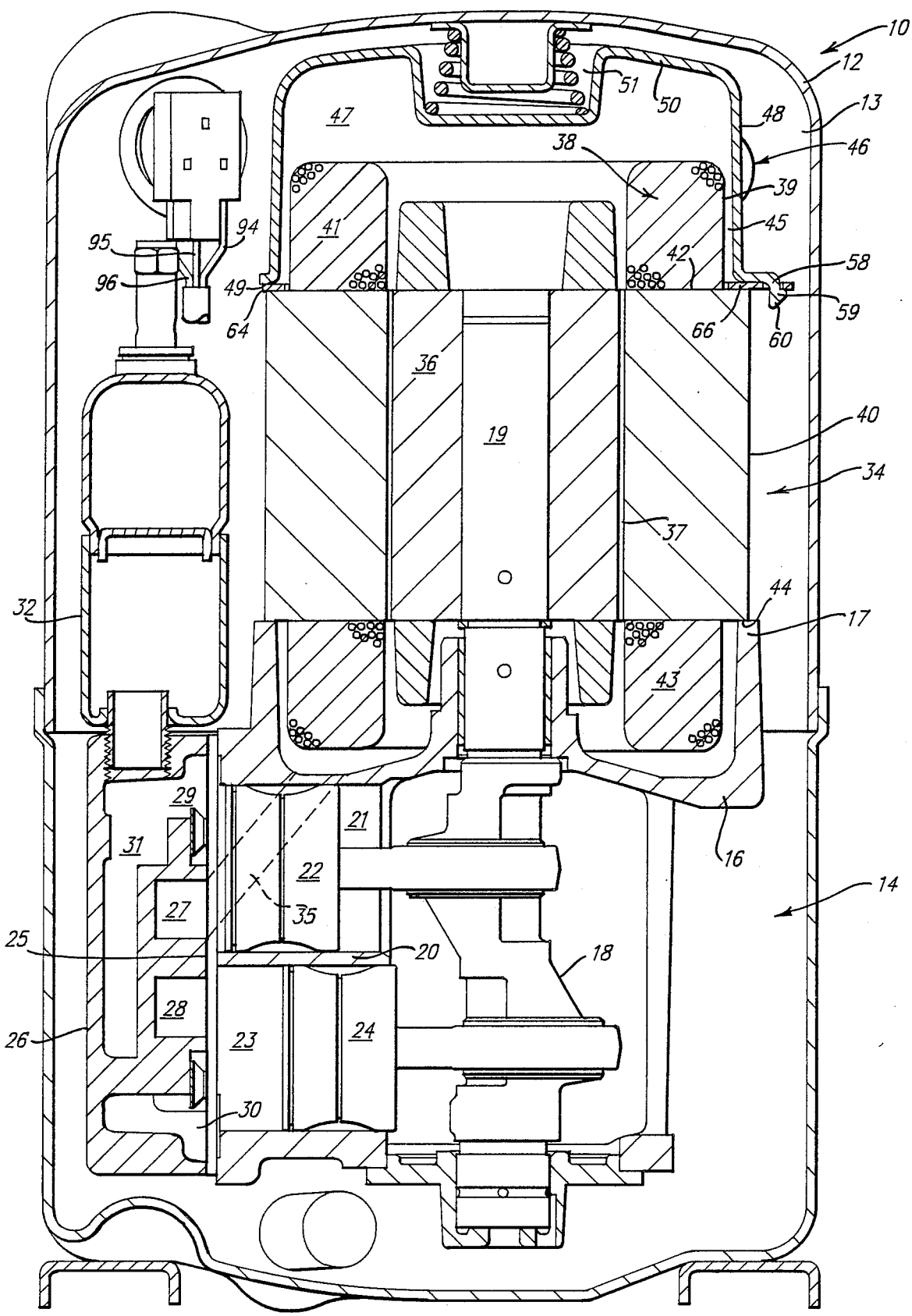
Figure 3:
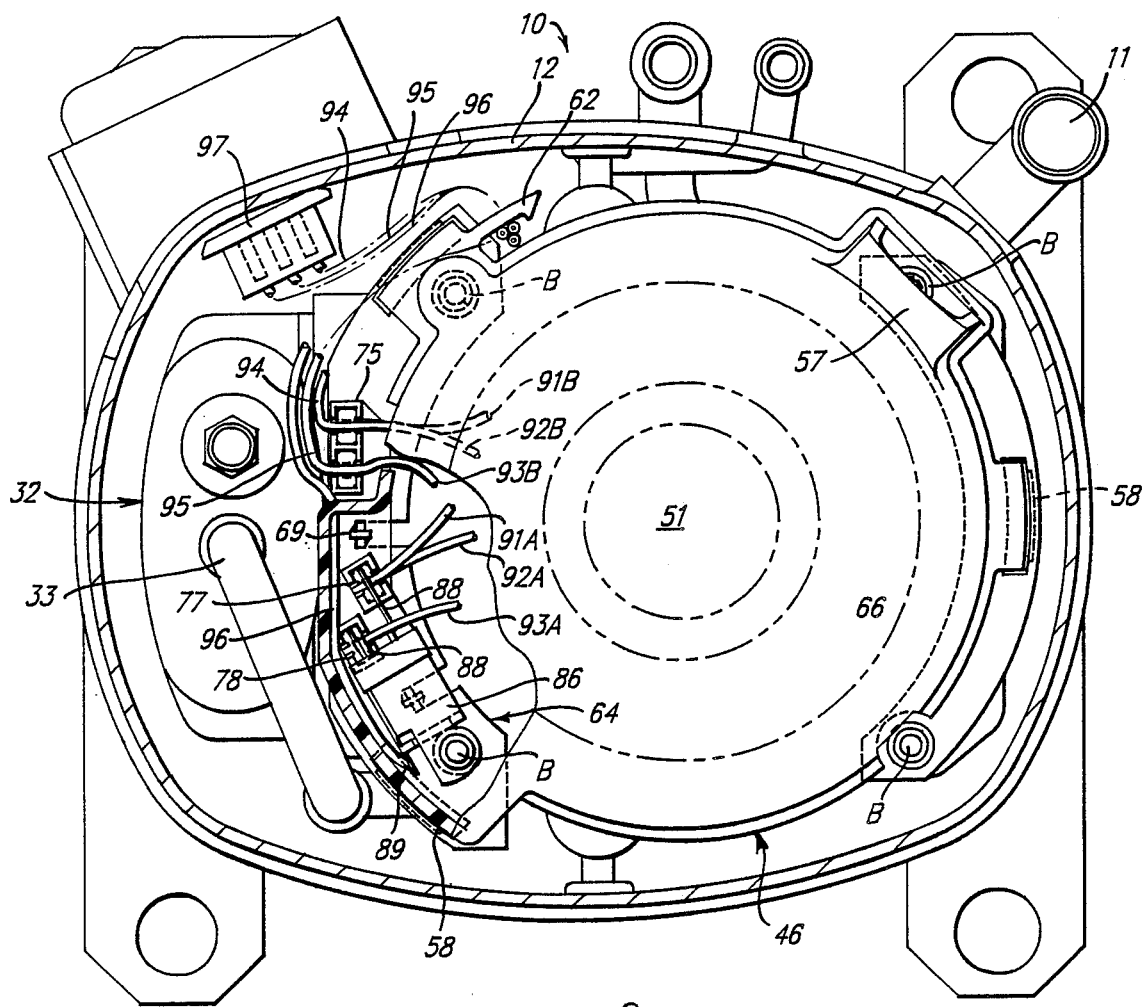
FIG. 3 is a top plan view of the motor compressor with portions removed therefrom to show a motor cover and a thermal overload protection arrangement for the motor.
Figure 4:
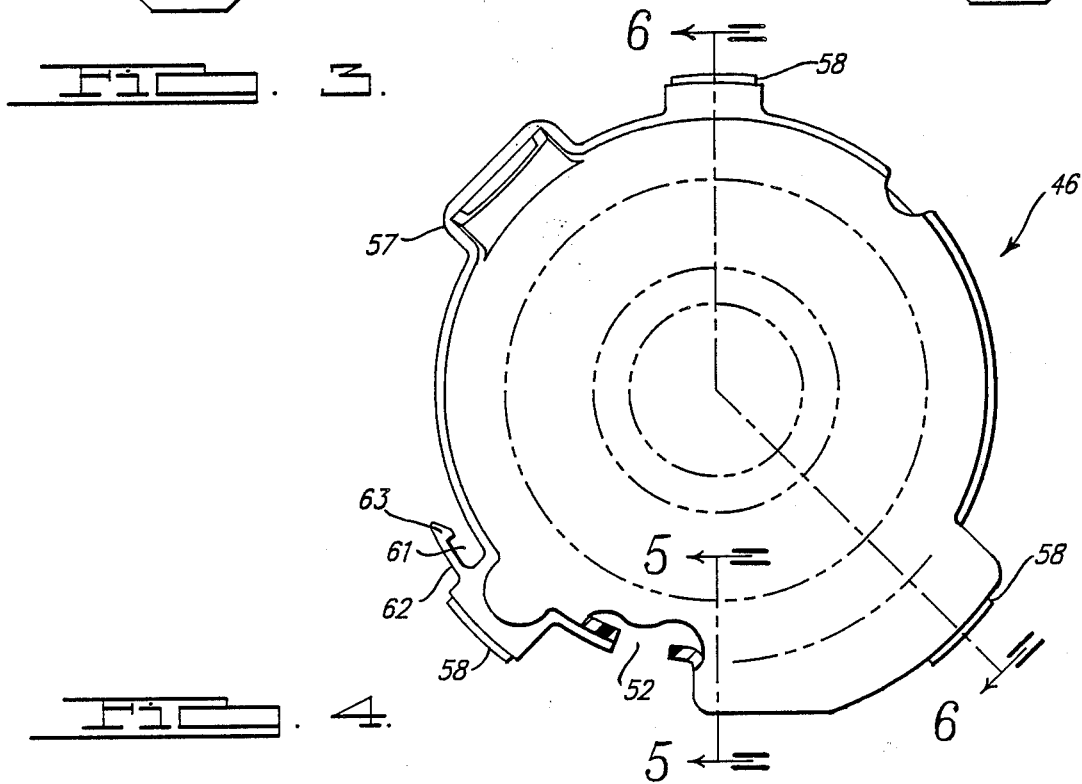
FIG. 4 is a top plan view of the motor cover.

FIGS. 15 and 16 are section views of the protector retainer taken along lines 15—15 and 16—16, respectively, of FIGS. 14 and 12.

FIG. 17 is a termination device used in the protector retainer.

FIGS. 18 and 19 show a representative termination.

FIG. 20 is an electrical schematic of the motor compressor.

Turning now to the drawings there is shown a hermetic refrigeration compressor indicated generally at 10 and comprising an outer shell 12 having at the top thereof a suction inlet 11 and defining an interior 13 within which is housed a compressor 14 of the reciprocating piston-type, a dynamoelectric motor 34 drivingly connected thereto, a shroud or motor cover 46 that overlies the top end of the motor, and a thermal protector or protection device 86 that protects the motor from overheating. A retention arrangement including a pair of arcuate retainer plates 64, 66 and a holder or connector block 70 advantageously secures the motor cover 46 and the protector 86 to the motor 34 such that the protector is proximate to the motor for electrical connection thereto and the motor cover supplies cooling gas to the protector. It should be noted that while the present invention is described with reference to a reciprocating piston-type compressor, it may be employed in connection with any type of motor compressor unit such as, for example, rotary or screw types.

The compressor 14 includes a lower housing 16 having an annular shoulder portion 17, a crankshaft 18 including an elongated drive shaft 19, a cylinder body 20 including a pair of pistons 22, 24 each disposed in a respective cylinder 21, 23, a valve plate 25 and a cylinder head 26 secured over the cylinders. The head 26 has chambers 27, 28 for conducting suction gas to the cylinders, chambers 29, 30 for receiving compressed discharge gas from the pistons and a central chamber 31. A muffler 32 receives heated discharge gas from the central chamber 31 and discharges the same through a discharge conduit 33 downwardly to a discharge exit and outwardly through shell (not shown).

The motor 34 is disposed above the lower housing 16 and includes a rotor 36 which is secured for rotation to the drive shaft 19 projecting from the crankshaft, a generally cylindrical stator structure 38 which encircles the rotor to define an air gap 37 therebetween and is secured to the shoulder portion 17, and coiled stator windings 39 describing an annular end turn portion 41, 43 adjacent each end, the motor cooperating with the crankshaft to drive the compressor. The stator includes a core structure 40 which has opposite ends defining generally flat annular end faces 42, 44 the lower end face 44 being supported on the shoulder portion 17, a series of bores (not shown) extending longitudinally between the end faces, and a fastener or bolt "B" disposed in each bore having a head adjacent to the upper end face 42 and a threaded body threadably engaged with the shoulder portion. The end turn portions 41, 43 extend generally perpendicularly upward from its respective annular end face 42, 44 to define around each a coil annulus encircled by its respective end face.

The motor cover 46 is integrally molded of a polymer and generally cup-shaped to form an interior chamber 47 which will overly and enclose the upper end of the motor structure to define an annulus 45 thereabout, the cover including a generally cylindrical side wall 48 having a peripheral bottom edge 49 and a generally planar top wall 50 provided with a centrally disposed cup-shaped recess 51. The side wall 48 includes an opening 52, an edge portion 53 adjacent the opening and spaced upwardly of the bottom edge 49, and latch fingers or flanges 58 extending generally longitudinally downward from the bottom edge. A cup-shaped wall portion 54 extends radially outward from the side wall 48 adjacent the opening therein to define an upper wall 56 and a reduced chamber 55 into which the thermal protector 86 is housed. The motor cover is provided with a suction gas inlet duct 57 to receive suction gas from the suction inlet 11 of the shell 12 whereby cooling gas is drawn into the interior chambers 47, 55 of the cover and directed at the end turn portion 41 of the stator and at the thermal protector 86.

Each flange 58 is resilient, laterally flexible, somewhat arcuate in cross-section and includes a shaped leg portion 59 terminating in a retention shoulder 60, each flange being adapted for insertion through a respective arcuate slot 67 in one of the retainer plates 64, 66 whereby the leg portion will resiliently deflect to allow the retention shoulder to pass through the slot whereupon the shoulder will seat against the bottom face of the receiving plate to inhibit reverse movement of the flange, thereby securing the cover 46 to the motor 34.

A wire retention finger 62 extends radially outward from one upper wall 56 to be exteriorly adjacent the cover circumference, the finger being integrally formed with one of the flanges and open at one end to define a slot 61 for receiving and keeping wire connections 94, 95, 96 extending from the connector block 70. A tooth 63 at the distal end of the finger constricts the slot opening to prevent unwanted removal of the wires therefrom.

A pair of thin, flat, arcuate retainer plates 64, 66 are bolted to the top annular end face 42 of the stator, each retainer plate being diametrically opposed to one another and including a pair of bolt holes 65 and one or more generally arcuate slots 67. Each bolt hole registers with one of the bores in the stator whereby to receive a bolt "B" and permit the respective plate 64, 66 to be secured to the top end face 42 of stator when the stator is secured to the shoulder portion 17. Each slot 67 is adapted to receive a resilient flange 58 from the motor cover. One retainer plate 64 is mounted adjacent the cover opening 52 and is sized to pass under the edge portion 53, the plate being provided with a pair of upwardly extending deformable ears 68. The free end of each ear is twisted to form a shoulder 69 for retaining the connector block 70.

The connector block 70 is provided for securing and positioning the thermal protector device 86 adjacent the end turn portion 41 and providing contact termination cavities 75, 76, 77, 78 for receiving a contact 90 and terminating wires in electrical communication with the end turn portion 41. The block comprises a generally planar body 71 having top and bottom surfaces 72, 74, a pair of openings 73 extending through the surfaces each opening 73 adapted to receive one respective ear 68, a cradle 84 for mounting the thermal protection device 86, and the insulation displacement cavities. One end portion of the block is adapted to position the cradle 84 with protector and the cavities 77, 78 interiorly of the cover. The other end portion of the block passes through and is adjacent the opening 52 and positions the cavities 75, 76 exteriorly of the cover. Each cavity defines a generally rectangular open at the top box-like structure and includes a pair of opposed end walls 81, a pair of opposed side walls 80, a wire receiving slot 82 extending downwardly from the top edge of each end wall, and an anvil 83 extending upwardly interiorly of the cavity.

As shown, the thermal protection device 86 is generally cylindrical and includes termination blades 87, 88, 89 each cooperating to complete an electrical interconnection between the protector, the stator and through 97 to an electrical power source. The protector device includes an interrupter switch 98 which serves to interrupt the operation of the motor (i.e., disable the motor) when the temperature exceeds a predetermined temperature. The device is purchased and forms no part of the invention.

The contacts 90 for completing an electrical termination are supplied by AMP Corporation and identified as Mag-mate terminals. Each contact includes an insulation displacement slot, a barb to bite into the cavity wall to retain the contact therein, a forward opening to seat about the anvil, a forward end to drive the wires to be connected inwardly of the slot and a rearward termination end portion extending from the cavity terminals. The portion of the connector block 70 disposed within the interior annulus 45 is positioned such that the wall 54 defining the chamber 55 prevents the terminals from upward movement thereby resulting in an unwanted disconnection during operation of the compressor.

The wires 94, 95, 96 extend from their terminations to terminals 90 and are prevented from moving outwardly of the cover by the retention finger 62 defining the slot 61, the finger describing a wire keeper and directing the wires longitudinally downwardly relative to the motor housing and upwardly through 97 to connect to a power source. Advantageously this orientation of the wires reduces strains.

FIG. 20 is an electrical schematic of the arrangement wherein the motor protector is connected to the stator windings comprising a pair of run windings 91, 92 and a start winding 93. The end turn portion 41 positions the coil ends 91A, 91B, 92A, 92B, 93A and 93B from the two run windings 91, 92 and the start winding 93 adjacent the protector for electrical connection to wires 94, 95 and 96 which connect through 97 to the power source. The termination is as follows: run windings 91, 92 have their ends 91A, 92A in cavity 78 and terminated to blade 87 interiorly of the cover and their other ends 91B, 92B in cavity 75 exteriorly of the cover and terminated to wire 94; start winding 93 has end 93A in cavity 77 and terminated to blade 88 interiorly of the cover and its other end 93B in cavity 76 exteriorly of the cover and terminated to wire 95; blade 89 of the protector is terminated interiorly of the cover to wire 96; and each of the wires 94, 95, 96 pass into the keeper slot 61 defined by finger 62 then downwardly and upwardly to the power source at 97 through the shell 12.

For assembly, the plates 64, 66 would be secured to the end face 42 using the bolts "B" through the holes 65 whereupon the block 70 would be positioned over retainer plate 64 and lowered whereby deformable ears 68 would pass through the openings 73. The ends of each ear would be twisted to form the retention shoulder 69. The cover 46 would be positioned such that flanges 58 would register with arcuate slots 67 on the two plates 64, 66 and lowered whereby leg portions 59 will flex to allow retention shoulders 60 to pass therebetween and engage the other side of the plate whereby to inhibit retrograde movement (i.e. unwanted removal of the motor cover) from the motor. It is to be understood that the motor cover 46 and the connector block 70 are generally fastened together by fingers and openings releasably interengaging to secure the cover to the plate and the block to the plate. Deformable fingers could extend from the block into holes in the plate, and the fingers instead of being deformable to form shoulders with their twisted ends could have shoulders like flanges 58. Similarly, the flange and openings for securing the cover relative to the plate could, respectively, include a flange finger extending from the plate for retaining receipt in an opening in the cover.

When mounted the protector 86 is disposed in the annulus 45 defined between the side wall 48 and the end turn portion 41, the protector being below the uppermost extension of the annular end portion 41. The duct 57 is automatically positioned generally diametrically from the protector and supplies cooling suction gas to each end turn portion when the cover is mounted to the plates 64, 66. Should the motor overheat a switch 98 in the protector 86 opens to interrupts circuit path to the power source.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A motor compressor assembly comprising a motor having end turns extending upwardly from an annular face thereof, a heat sensitive circuit protector disposed in electrical circuit relationship with said end turns for protecting said motor from overheating, and a cover sized to enclose the end turns of said motor and said protector, characterized by a retainer rigidly secured to the annular face, a connector block secured to said retainer for retaining said protector below the upward extension of said end turns and interengaging fingers and slots releasably securing the cover to the retainer, said connector block disconnected from said cover.

2. The motor compressor assembly as recited in claim 1 wherein said interengaging fingers and slots comprise said cover including a resilient flexible latch finger providing a shoulder and said retainer including a slot therethrough sized to receive the latch finger, the edges describing said slot forming an abutment for the shoulder to seat against to inhibit retretrograde movement of the finger.

3. The motor compressor assembly as recited in claim 1 wherein one and the other of said retainer and connector block includes, respectively, a deformable retainer finger and an opening sized to receive said retainer finger, said retainer finger being passed through said opening and deformed to form an abutment whereby to secure the connector block to the retainer.

4. The motor compressor assembly as recited in claim 1 wherein the cover is overlying and encircling the end turns and dimensioned to define an annulus therearound and therebetween, and said connector block positions the circuit protector in said annulus adjacent to the end turns.

5. The motor compressor assembly as recited in claim 1 wherein said cover includes an inlet duct for supplying cooling gases into the cover and said interengaging fingers and slots cooperate to secure the cover to the motor and position the inlet duct relative to the end turns and circuit protector.

6. A dynamoelectric motor compressor assembly of the type including a motor protection device adapted to be mounted on a block and electrically connected to the motor windings, a motor cover securable to the motor for enclosing the windings and the motor protection device and directing cooling suction gas at the protection device, a retainer member separate from said cover for fastening both said cover and said block to the motor end such that said protection device is entirely below the upward extension of the motor winding, and interengageable fingers and openings releasably securing the cover and the block to the retainer member the fingers passing through the openings and hooking over edge portions defining the openings whereby to prevent unwanted retregrade movement of the finger from its opening.

7. The motor compressor assembly as recited in claim 6 wherein said cover includes a generally flat upper wall and a generally cylindrical side wall which is positioned radially outward relative to the end turn portion to form an annular chamber for receiving said protector, said upper wall inhibiting electrical terminals, which terminals form electrical connections between the protector and respective of the windings, from upward movement and disconnection.

8. The motor compressor assembly as recited in claim 6 wherein said motor windings project upwardly from an annular end face of said motor and define a stator assembly, a plurality of bolts extend through the end face for securing the stator to the compressor, and said retainer member includes a first and a second plate member each having a bolt hole adapted to receive one said bolt and be secured to the annular end face of said motor when the motor is secured to the compressor, one plate member including a bendable ear extending therefrom for passing through an associated opening in the block to be twisted and thereby form a shoulder inhibiting unwanted movement.

9. The motor compressor assembly as recited in claim 8 wherein an arcuate opening in each plate member is adapted to receive a respective flexible finger from the cover, the finger including an enlarged shoulder portion adapted to pass through the opening and engage the plate member.

10. The motor compressor assembly as recited in claim 8 wherein said block includes a pair of openings therethrough each adapted to receive a respective bendable ear from said one plate member.

11. The motor compressor assembly as recited in claim 6 including restraint means on said cover for restraining wires exiting from their terminations to said protector.

12. The motor compressor assembly as recited in claim 11 wherein said restraint means includes a keeper finger extending circumferentially about the cover, the keeper finger defining a constricted slot for gripping the wires.

13. In a refrigeration system of the type including a motor compressor unit, heat sensitive means, and a cover for enclosing one end of the motor and the heat sensitive means, said heat sensitive means for electrically disabling the motor when temperature in the cover exceeds a predetermined temperature, characterized by a support block for supporting said heat sensitive means and terminating electrical wires electrically connected to said heat sensitive means and said motor, said cover defining a substantially closed annular chamber adjacent the motor windings for receiving the heat sensitive means a wall of said cover closely overlying the heat sensitive means and the wire terminations thereto whereby to inhibit unwanted movement of the heat sensitive means or the wires from their termination in the block, and retention means secured to said motor compressor unit for retaining said block thereto and positioning the heat sensitive means interiorly of said chamber such that the support block is disconnected from said cover and terminated wires may extend outwardly from the cover for connection to an electrical source for running the motor.

14. The refrigeration system as recited in claim 13 wherein said retention means comprises means for orienting the cover relative to the motor.

15. The refrigeration system as recited in claim 14 wherein said cover includes an inlet duct, said retention means comprises a plate secured to the motor and interengaging fingers and openings operating between said plate and cover whereby said duct is oriented relative to the motor when retained thereto.

16. The refrigeration system as recited in claim 13 wherein said retention means retains said support block independently of the retention of said cover.

17. An apparatus for use in positioning a thermally responsive circuit protector in close proximity to conductive end turns projecting upwardly from one end face of an electric motor as a coil annulus, said apparatus comprising a dielectric circuit protector holder to hold the protector and conductive contacts when terminated to respective end turns, a retainer plate securable to the end face to secure the protector holder below the uppermost extension of said coil annulus and radially adjacent thereto, a cover mountable to the end of the motor and having a wall portion adapted to closely overly the protector when in the holder to inhibit upward movement of the protector and the contacts, and interengaging openings and fingers operating between the plate and said cover and the plate and said holder for locking one to the other.

18. The apparatus as recited in claim 17 including the plate having a finger adapted to interlockingly engage within an opening of the holder and the cover having a finger to interlock within an opening in said plate.

19. The apparatus as recited in claim 18 wherein there are a pair of spaced retainer plates one including a pair of deformable fingers to be received in openings in the holder and be deformed therein whereby to retain the holder, said cover including flexible flange-like fingers to be snap-fit into respective openings in each said plate member.

20. In a motor compressor of the type including a rotor, a stator comprising an iron core encircling the rotor and including an annular end face at one end and an annular end turn portion of lesser diameter than and projecting upwardly from the end face of said core, a cover securable at said one end of the stator in spacedly overlying relation to the winding and including a side wall to define an annulus around the end turn portion, a protector assembly including a holder and a thermally responsive protector secured to the holder and electrically connectable to the end turn portion for disabling the motor in the event of overheating, and securing means for securing the protector in close proximity to the end turn portion and the cover to said one end of the stator, said securing means characterized by a pair retainer plates each secured to said annular end face, said holder being secured to at least one plate so as to position the protector in said annulus below the upward extension of said stator annular end turn portion, interengageable means on said retainer plates for interengaging with first portions of said holder and second portions associated with said cover.

21. The motor compressor as recited in claim 20 said interengaging means including fingers and openings from one said plate operating to engage respective portions of said cover and holder.

22. The motor compressor as recited in claim 20 wherein said first portion includes a retention finger having a shoulder to interengage one opening and said second portion includes a slot to interengage one finger.

23. In an electric motor compressor assembly, a motor stator comprising an annular end face encircling an annular end turn portion of the stator coils extending perpendicularly to the annular end face, at least one plate rigidly secured to said end face using attachment bolts used to secure the stator to said motor, a thermal protector positioned in close proximity to said end turn portion for electrical connection thereto whereby to interrupt operation of the motor, and a shroud securable to said plate for enclosing the protector and the end turn portion, characterized by a holder disengaged from said shroud for retaining and positioning the protector radially outward from and entirely below the upward extension of said end turn portion, said plate retaining both said holder and said shroud.

24. The motor compressor assembly as recited in claim 23 comprising interengageable fingers and openings releasably securing the shroud to the plate and fixedly securing the holder to the plate, the fingers passing through the openings the end portions thereof engaging the edge portions defining the openings.

25. The motor compressor assembly as recited in claim 24 wherein said plate associates a deformable retention finger extending therefrom with a retention opening in said holder the end portion of said retention finger being deformed to define a shoulder for interengaging the edge portion of said retention opening.

26. The motor compressor assembly as recited in claim 23 characterized by interengaging first portions on said plate and said holder, said first portions including a deformable ear on one having a free end portion sized to pass through an aperture in the other and to have its end deformed to define a retention shoulder for securing the holder.

27. The motor compressor assembly as recited in claim 26 characterized by interengaging second portions on said plate and said shroud, said second portions including a resiliently flexible latch finger having a shoulder on one being sized to pass through an opening in the other such that the shoulder engages the opening to prevent rearward withdrawal.

28. The motor compressor assembly as recited in claim 27 wherein said shroud includes said latch finger and said plate includes said opening for receiving said latch finger.

29. The motor compressor assembly as recited in claim 28 including two plates each generally arcuate and flat and attached to said end face generally at diametrically opposite locations, each plate including an opening for receiving a latch finger from said shroud and one plate including a pair of deformable retention fingers for receipt by respective openings in said holder.

30. The motor compressor assembly as recited in claim 23 wherein said shroud includes a side wall and a top wall portion forming a chamber overlying said protector, and an opening in said side wall passing a portion of said holder outwardly from the chamber, the wall portion inhibiting electrical connections to said protector from moving upwardly thereto.

31. The motor compressor assembly as recited in claim 23 including strain relieving means integrally formed with said shroud for strain relieving wires terminated to said protector, said wires extending outwardly from said shroud and to an electrical power source for driving the motor, said strain relieving means securing said wires extended outwardly of said shroud.

32. The motor compressor assembly as recited in claim 31 wherein said strain relieving means includes an arcuate hooked finger extending radially outwardly from the shroud and circumferentially about a portion of the shroud, said hooked finger defining a constricted channel for securing said wires.

33. The motor compressor assembly as recited in claim 30 wherein said holder includes a plurality of cavities interiorly of said chamber each cavity being box-shaped and upperly open to receive a forward end portion of a terminal inserted downwardly therein to make electrical connection with at least one conductive coil from the stator, a rearward end portion of said terminal being electrically connected to said protector and prevented by said top wall portion from moving upwardly from said cavity.

34. The motor compressor assembly as recited in claim 30 wherein said stator includes two run windings and a start winding the opposite ends of each winding being disposed at the one end of said stator, said holder comprises a plurality of cavities each for receiving a terminal and the end of at least one winding and each including a pair of first cavities enclosed within said chamber and a pair of second cavities exteriorly of said chamber, one of said first and one said second cavities receiving, respectively, one respective coil end from each said run windings and said first cavity including a connection to the protector, the other of said first and said second cavities receiving, respectively, one respective coil end from said start winding and said other first cavity including a connection to the protector.

35. The motor compressor assembly as recited in claim 23 wherein said shroud includes a duct for supplying cooling gas to the end turn portion said plate simultaneously positioning said duct when said shroud is secured to said plate.

36. A hermetic motor/compressor assembly comprising a hermetically sealed shell, a compressor and a motor within said shell said motor being operatively connected to said compressor and having terminable coil ends disposed at one axial end, a heat sensitive protector connectable to a power source and the motor for interrupting operation of the motor when a preselected temperature is reached, said protector being adjacent said terminable coil ends, and securing means for electrically terminating the coil ends to the protector, said securing means characterized by a solderless arrangement below the motor upward extension for terminating respective of said coil ends and comprising a dielectric body including side walls which define an upperly open cavity for receiving the forward mating end portion of an insulation displacement type contact inserted inwardly thereinto, one side wall of said cavity including an axial slot extending inwardly from a top edge thereof, and said contact having a rearward end portion extending outwardly of said cavity and electrically connectable to said protector, said forward mating end portion including an axial slot extending rearwardly from its forward mating end for mechanically gripping and completing an electrical connection with a coil end inserted therein, said axial slots being substantially in register when the contact is received in said cavity, and said coil end has its axis transverse to the axis of insertion.

37. The hermetic motor/compressor assembly as recited in claim 36 including a cover overlying said coil ends and said protector, further characterized by fastening means connected to said motor for fastening the cover and said protector to the motor, said cover having a top wall disposed closely above the rearward end portion of each said contact whereby to inhibit said forward mating end portion from popping out from its cavity and disturbing the electrical termination between its forward mating end portion and a wire therein.

* * * * *